US007970136B2

(12) United States Patent
Blumberg et al.

(10) Patent No.: US 7,970,136 B2
(45) Date of Patent: Jun. 28, 2011

(54) APPARATUS AND MATERIALS FOR TWO-STAGE PRINTING OF VALUE INDICIA

(75) Inventors: Stephen L. Blumberg, Waterford, CT (US); David W. Beckstrom, Milford, CT (US); Thomas J. Foth, Trumbull, CT (US); David K. Asano, Easton, CT (US); Ian A. Siveyer, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1334 days.

(21) Appl. No.: 11/415,307

(22) Filed: May 1, 2006

(65) Prior Publication Data

US 2007/0253550 A1 Nov. 1, 2007

(51) Int. Cl.
*G09C 3/08* (2006.01)

(52) U.S. Cl. ........... 380/51; 355/133; 396/429; 396/661

(58) Field of Classification Search ........................ None
See application file for complete search history.

(56) References Cited

U.S. PATENT DOCUMENTS

| | | | | |
|---|---|---|---|---|
| 5,462,909 | A * | 10/1995 | Lakes et al. | 503/201 |
| 5,480,244 | A * | 1/1996 | Senda | 400/582 |
| 5,598,970 | A | 2/1997 | Mudry et al. | |
| 5,682,504 | A * | 10/1997 | Kimura et al. | 358/1.4 |
| 5,848,401 | A | 12/1998 | Goldberg et al. | 705/408 |
| 6,010,156 | A | 1/2000 | Block | |
| 6,060,428 | A * | 5/2000 | Chang et al. | 503/201 |
| 6,147,698 | A | 11/2000 | Zable et al. | |
| 6,325,505 | B1 | 12/2001 | Walker | |
| 6,383,631 | B1 * | 5/2002 | Mehta | 428/352 |
| 6,427,020 | B1 * | 7/2002 | Rhoads | 382/100 |
| 6,610,386 | B2 * | 8/2003 | Williams et al. | 428/195.1 |
| 6,939,062 | B2 | 9/2005 | Ogg | |
| 7,083,345 | B1 | 8/2006 | Kuwahara | |
| 7,243,842 | B1 | 7/2007 | Leon et al. | |
| 2002/0033853 | A1 | 3/2002 | Aratsu | 347/16 |
| 2002/0196457 | A1 | 12/2002 | Nunokawa | 358/1.13 |
| 2003/0140017 | A1 | 7/2003 | Patton | |
| 2003/0179253 | A1 | 9/2003 | Manduley | |

(Continued)

FOREIGN PATENT DOCUMENTS

EP 0376575 A2 7/1990

(Continued)

OTHER PUBLICATIONS

Postal Bulletin 22081 (Jul. 25, 2002), p. 76. Article entitled "New Form of PC Postage." Postage Technology Management, Product Development; PC Postage—Stamps.com's NetStamps.

(Continued)

*Primary Examiner* — Stephen D Meier
*Assistant Examiner* — Alexander C Witkowski
(74) *Attorney, Agent, or Firm* — Brian A. Collins; Charles R. Malandra, Jr.

(57) ABSTRACT

A roll of label stock includes a plurality of first regions suitable for being printed on by thermal printing. The first regions are blank. The label stock also includes a plurality of pre-printed color images, each associated with a respective one of the first regions. A stamp printer that prints postage indicia on the label stock refrains from printing an image thereon, but would print images on another type of label stock that does not include pre-printed images.

13 Claims, 7 Drawing Sheets

U.S. PATENT DOCUMENTS

| | | | |
|---|---|---|---|
| 2004/0088271 | A1 | 5/2004 | Cleckler et al. |
| 2004/0101768 | A1 | 5/2004 | Wiliams |
| 2004/0254898 | A1 | 12/2004 | Parker |
| 2005/0071296 | A1 | 3/2005 | Lepkofker |
| 2005/0201796 | A1 | 9/2005 | Arkin |
| 2006/0136347 | A1 | 6/2006 | Reichelsheimer et al. |
| 2006/0260753 | A1 | 11/2006 | Crum |
| 2009/0180132 | A1 | 7/2009 | Meyerhofer et al. |

FOREIGN PATENT DOCUMENTS

| | | | |
|---|---|---|---|
| JP | 2001130062 | A * | 5/2001 |
| JP | 2001 180058 | | 7/2001 |
| WO | 99/66456 | | 12/1999 |
| WO | 01/35346 | A2 | 5/2001 |

OTHER PUBLICATIONS

Postal Bulletin 22097 (Mar. 6, 2003), p. 70. Article entitled "NetStamps Update." Postage Technology Management, Product Development, PC Postage—new examples of Stamps.com's NetStamps.

Craig Selig NetStamps—NetStamps price list, from http://www.pnc3.com/cvp/netstamps.htm Accessed on Aug. 15, 2007 (17 pages).

Image File Wrapper of U.S. Appl. No. 11/415,030.

* cited by examiner

APPARATUS AND MATERIALS FOR TWO-STAGE PRINTING OF VALUE INDICIA

CROSS-REFERENCE TO RELATED APPLICATION

This application is related to application Ser. No. 11/415,030, entitled "Two-Stage Printing of Value Indicia" and filed contemporaneously herewith, which related application is incorporated herein by reference in its entirety.

BACKGROUND

This invention relates generally to printing of value indicia, and more particularly to operation of personal postage stamp printers.

Personal postage stamp printers have been proposed. With such printers, postal customers, after prepayment of postage, may be allowed to print adhesive postage stamps. According to some proposals, the postal customers may be permitted to create or supply a custom image to be incorporated as part of the postage stamps.

To achieve widespread acceptance of personal postage stamp printers, it may be desirable that the cost of the devices be kept very low. Consequently, it may be desirable that personal postage stamp printers incorporate a low cost printing technology, such as black and white thermal printing. However, prospective customers may find the concept of personal stamp printing more attractive if the stamps they produce were to include color images.

SUMMARY

A roll of label stock includes a plurality of first regions suitable for being printed on by thermal printing, and a plurality of pre-printed color images. Each of the color images is associated with a respective one of the first regions. Each of the first regions is blank.

At least one of the pre-printed color images may be different in appearance from at least one other of the pre-printed color images. That is, the roll of label stock may have two or more different color images thereon. It may be the case that the pre-printed color images were not printed by thermal printing. The pre-printed color images may have been printed by ink jet or off-set printing.

In another aspect, a pre-printed label includes a blank region suitable for being printed on by thermal printing, and a pre-printed color image.

The color image on the pre-printed label may not have been printed by thermal printing. The label may be part of a roll of pre-printed printing stock.

At a certain stage of processing the pre-printed label, it may also include a value indicium such as a postage indicium printed by thermal printing in the blank region. The value indicium may include a bar code such as a two-dimensional bar code In another aspect, a stamp printer includes a housing and a thermal print head installed in the housing. The stamp printer further includes a control device in the housing for controlling the thermal print head, and a reader in the housing for reading control indicia on printing stock. The control device is responsive to the reader to detect a type of the printing stock. The control device is operative to cause the print head to print images and postage indicia on the printing stock if the detected type of the printing stock is of a first type, and, if the detected type of the printing type is of a second type different from the first type, the control device is operative to cause the print head to print postage indicia on the printing stock without the print head printing any image on the printing stock.

The printing stock may be a roll of printing stock, and the stamp printer may also include a transport mechanism in the housing for the purpose of receiving the roll of printing stock and transporting the roll of printing stock past the print head.

The control device may selectively control the transport means and the print head such that:

- a first portion of the roll of printing stock is transported past the print head without printing thereon to bring a second portion of the roll of the printing stock to the print head;
- and thereafter the print head prints a first postage indicium on the second portion of the roll of printing stock;
- and, after the printing of the first postage indicium, the roll of printing stock is reverse-fed to bring the first portion of the roll of printing stock to the print head;
- and, after the reverse feeding of the printing stock, the print head prints a second postage indicium on the first portion of the roll of printing stock.

The stamp printer may also include a communication device for interfacing the control device to a computer. The control device may be operative to control the transport mechanism in response to input received by the control device from the computer.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in its various aspects, facilitates a program to allow individual postal patrons to print (or complete the printing of) their own custom designed postage stamps including color illustrations. Alternatively, the postal patrons may choose from among standard color images to be included in the stamps they print. Pre-printed rolls of postage stamp printing stock are delivered to the postal patrons. The rolls of postage printing stock include color images. Finished postage stamps are printed by the postal patrons using their personal postage stamp printers to print postage indicia information on the rolls of postage printing stock. The personal postage stamp printers employ a relatively inexpensive printing technology such as thermal printing. The resulting postage stamps may be highly attractive because of the inclusion therein of the pre-printed color images. At the same time, the postal patrons enjoy the convenience and other advantages of personal stamp printing.

Figure 1:
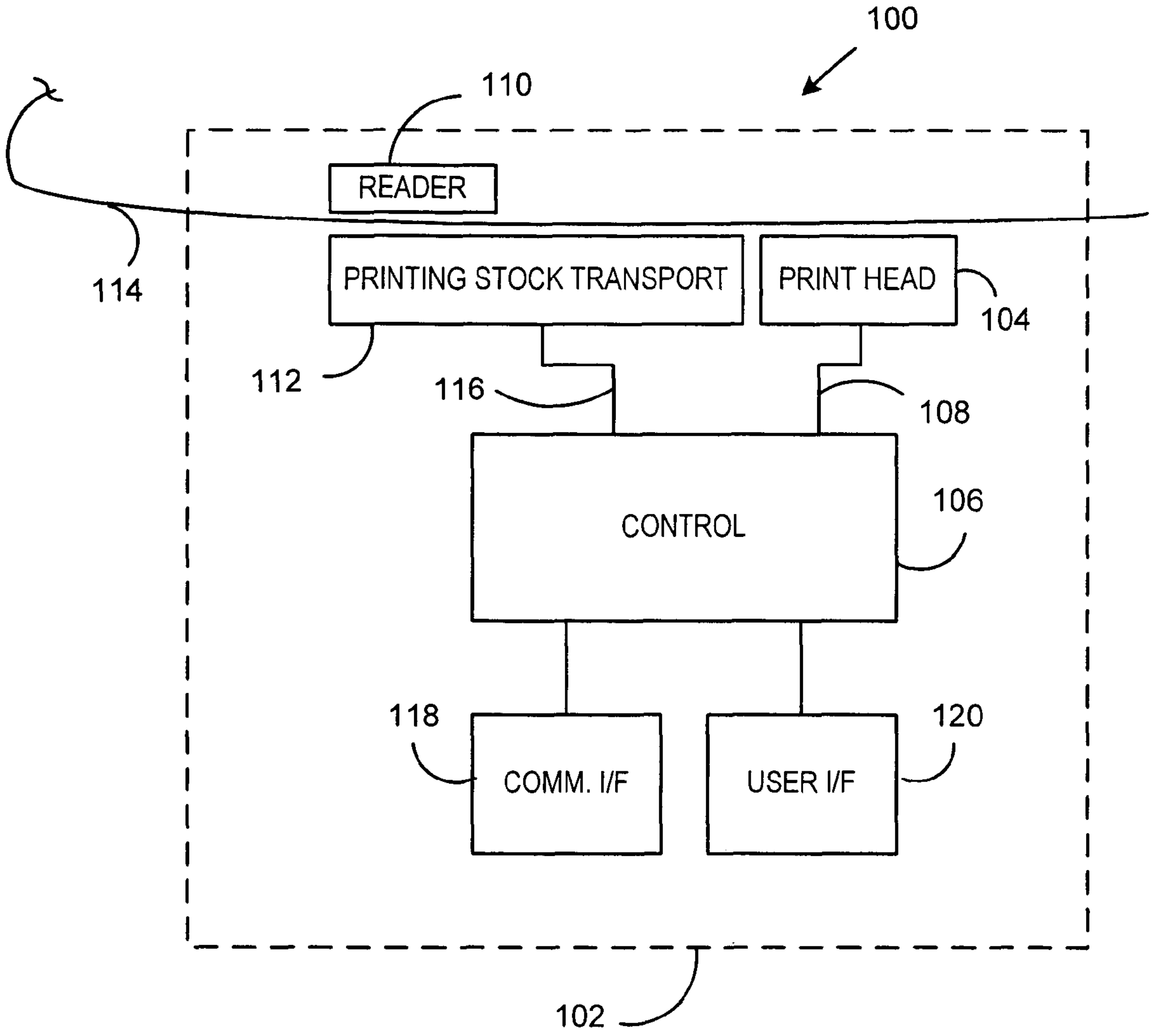
FIG. 1 is a partially-block, partially-schematic illustration of a stamp printer provided in accordance with aspects of the invention.

FIG. 1 is a partially-block, partially-schematic illustration of a stamp printer 100 provided in accordance with aspects of the invention.

The stamp printer 100 includes a housing (schematically indicated at 102). The housing 102 may be of molded plastic or other conventional construction, and may include a separate base, which is not shown. Also included in the stamp printer 100 is a thermal print head 104. The thermal print head 104 may be constructed and may perform printing operations in accordance with conventional principles, except that the manner in which the thermal print head 104 is controlled may, in accordance with aspects of the invention, differ from conventional practices.

The stamp printer 100 further includes a control device 106 that is in the housing 102 and is connected by signal path or paths 108 to the print head 104. The control device 106 may be microprocessor- or microcontroller-based, and thus may include a microprocessor (not separately shown) or a microcontroller (not separately shown) together with memory (not separately shown) to store software and/or firmware to control the microprocessor or microcontroller. The memory may serve as working memory as well as program memory and/or additional working memory/data storage memory may be provided as part of the control device 106. The software/firmware may include program instructions to control the control device 106 to operate in accordance with at least some aspects of the invention, as described herein. As will be seen, the control device 106 is operative to control the thermal print head 104. The memory included in the control device 106 may, in some embodiments, store bit map or other image(s) to be printed on one type of stamp printing stock that may be used with the stamp printer 100.

In addition, the stamp printer 100 also includes a reader 110 that is in the housing 102 and is connected with the control device 106 by one or more signal paths (not shown, to simplify the drawing). As described further below, the reader 110 is operative to read bars or other control indicia printed on the reverse side of rolls of stamp printing stock to be printed on by the stamp printer 100. The reader 110 is also operative to provide to the control device 106 indications of the control indicia read by the reader 110.

Still further, the stamp printer 100 includes a transport mechanism 112 that is also at least partially in the housing 102. The transport mechanism 112 is provided to receive a roll of printing stock (shown schematically at 114) and to transport the roll of printing stock 114 past the reader 110 and the thermal print head 104, so that the former can read, and the latter can print on, the roll of printing stock 114. One or more signal paths 116 operatively couple the transport mechanism 112 to the control device 106 to allow the control device 106 to control the transport mechanism 112.

The stamp printer 100 also includes a communication interface 118 that is operatively coupled to the control device 106. The communication interface 118 allows the control device to be in communication, at least from time to time, with external devices. Such external devices may include a data center (not shown in FIG. 1) from which the stamp printer 100 may receive authorization to print postage stamps. Such external devices may also or alternatively include a personal computer ("PC"; not shown in FIG. 1) by which a user/holder of the stamp printer 100 may communicate with the stamp printer 100. The communication interface may be partly or entirely within the housing 102 of the stamp printer 100.

The stamp printer 100 may further include a user interface, schematically represented at 120. The user interface allows the user to interact with the stamp printer 100 and may include one or more displays, push buttons, a touch screen, etc. (all of which are not separately shown). In some embodiments, the user interface 120 may be dispensed with, and all interaction between the user and the stamp printer 100 may be via a PC (not shown in FIG. 1) that is in communication with the control device 106 of the stamp printer 100 via the communication interface 118.

Figure 2:
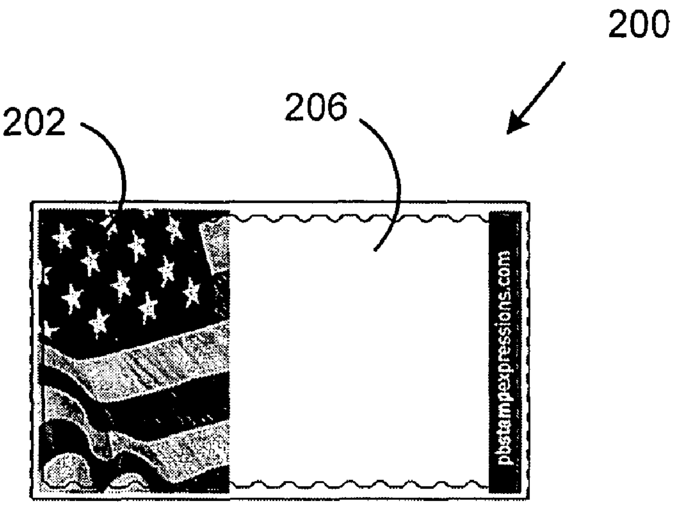
FIG. 2 illustrates a pre-printed postage stamp blank shown in isolation from a roll of stamp printing stock of which it is a part.

FIG. 2 illustrates a pre-printed postage stamp blank 200 shown in isolation from the roll of stamp printing stock 114, the postage stamp blank 200 being part of the roll of stamp printing stock 114. The same postage stamp blank 200 is illustrated in schematic terms in FIG. 3. It will be understood that the roll of stamp printing stock 114 includes many such postage stamp blanks held sequentially on a backing, which is not shown in FIG. 2. In some embodiments, the postage stamp blank includes a pressure sensitive adhesive that is exposed when the blank is removed from the backing.

Figure 3:
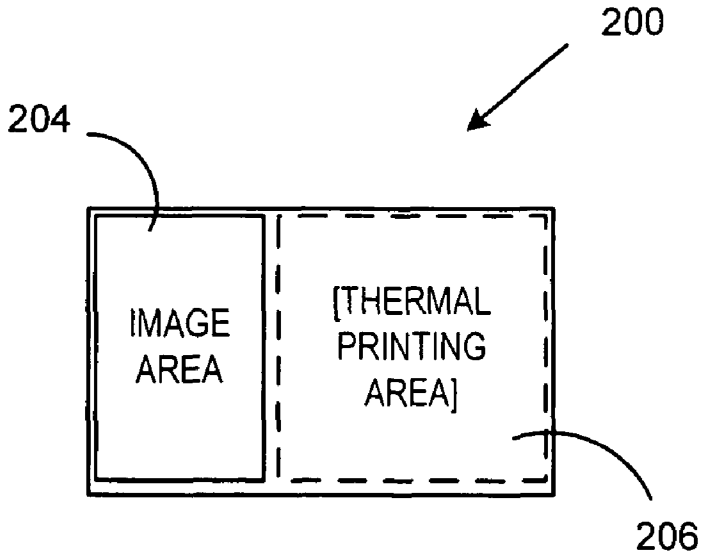
FIG. 3 is a schematic representation of the postage stamp blank of FIG. 2.

The postage stamp blank 200 includes a pre-printed color image 202 (FIG. 2) in an image area 204 (FIG. 3). The pre-printed color image may have been printed by a printing process such as offset printing or inkjet printing and may have been produced by four-color printing.

The postage stamp blank 200 also includes a blank area 206 that is suitable for black and white thermal printing. The purpose of the blank area 206 is to receive the postage indicia information (such as denomination amount, 2-D barcode such as an IBIP—"Information Based Indicia Program"—barcode) to complete the printing of the stamp. The blank area may be suitably treated so as to support thermal printing thereon. Alternatively, the entire stock front surface may initially have been suitable for thermal printing, and the image area may thereafter have been suitably treated before pre-printing of the image 202, such that satisfactory off-set or inkjet printing of the image 202 in the image area could be achieved in the image area 204.

Figure 4:
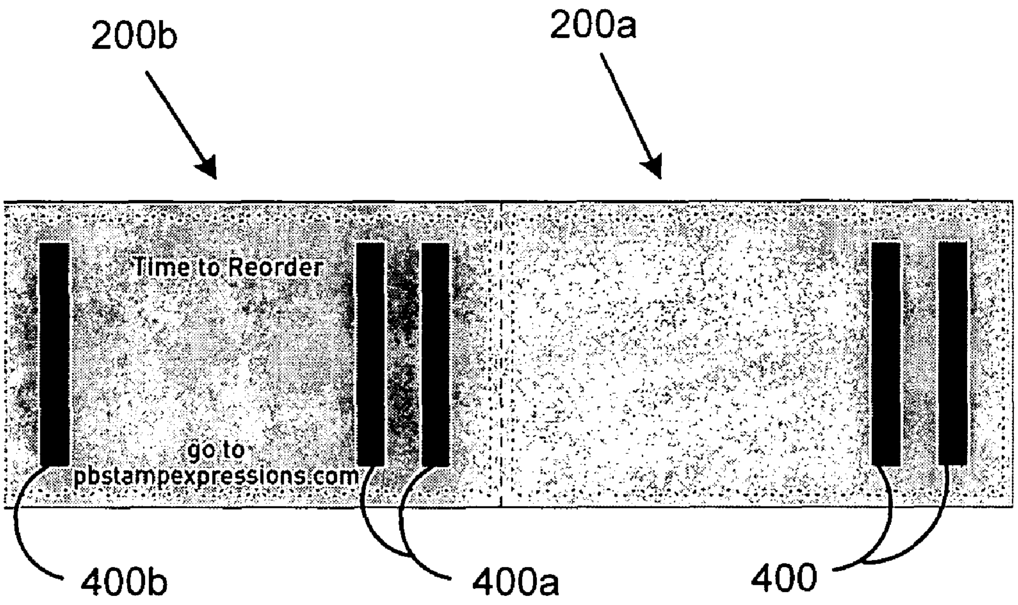
FIG. 4 shows the reverse side of two connected postage stamp blanks like the postage stamp blank of FIG. 2.

FIG. 4 shows the reverse side of two connected postage stamp blanks 200*a*, 200*b*, which have front sides (not shown) that may be identical to the front side of postage stamp blank 200 shown in FIG. 2. (In particular, the reverse side of the backing is shown in FIG. 4.) The reverse side of postage stamp blank 200*a* has printed thereon two bars 400 spaced a short distance (e.g., about the width of the bars) apart from each other. Each bar 400 may be similar to an individual timing mark (not separately shown) previously proposed to indicate to the stamp printer a timing at which printing is to occur on stamp printing stock. The presence of the two bars 400 indicates that the printing stock is of a type which includes a pre-printed image, so that only the postage indicia information needs to be printed on the front surface of the stamp blank (i.e., in the blank area 206, FIGS. 2 and 3) in order to complete the stamp. Accordingly, the bars 400 may function as control indicia to control the stamp printer to print in a certain manner on the front side of the stamp blank.

The reverse side of postage stamp blank 200*b* includes two bars 400*a* which are the same in configuration and position relative to the blank 200*b* as the bars 400 are relative to the blank 200*a*. In addition the reverse side of postage stamp blank 200*b* includes a third bar 400*b* at the opposite end of the stamp blank (i.e., spaced rather far from the bars 400*a*). The third bar 400*b* may serve as an end-of-roll (or near-end-of-roll) indicator to the stamp printer 100. In response to detecting the third bar 400*b*, the stamp printer 100 may communicate with the PC (not shown in FIG. 1) to prompt the user to order a new roll of stamp printing stock. In addition, or alternatively, detection of the end-of-roll indicator may cause the stamp printer to cause a light to flash on the stamp printer or may provide another indication to the user that the end of the roll has been reached.

Figure 5:
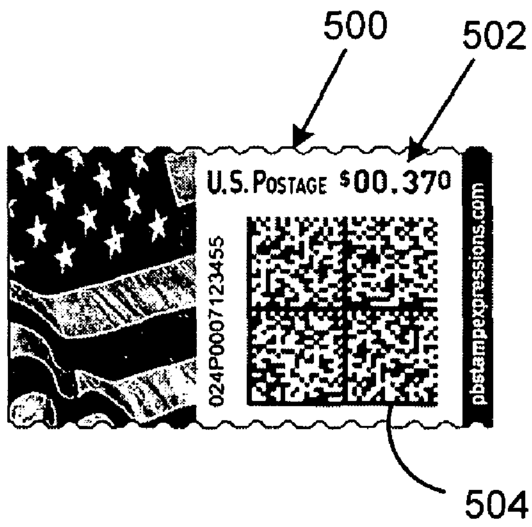
FIG. 5 shows the postage stamp blank of FIG. 2, after printing thereon of postage indicia information to produce a completed postage stamp.

FIG. 5 shows the postage stamp blank 200 of FIG. 2, after printing thereon of postage indicia information 500 to produce a completed postage stamp. It will be noted that the postage indicia information 500 includes numerals 502 that indicate the denomination of the stamp, as well as an IBIP two-dimensional bar code 504. It will also be noted that the postage indicia information 500 has been printed in the formerly blank area 206 shown in FIGS. 2 and 3.

Figure 6:
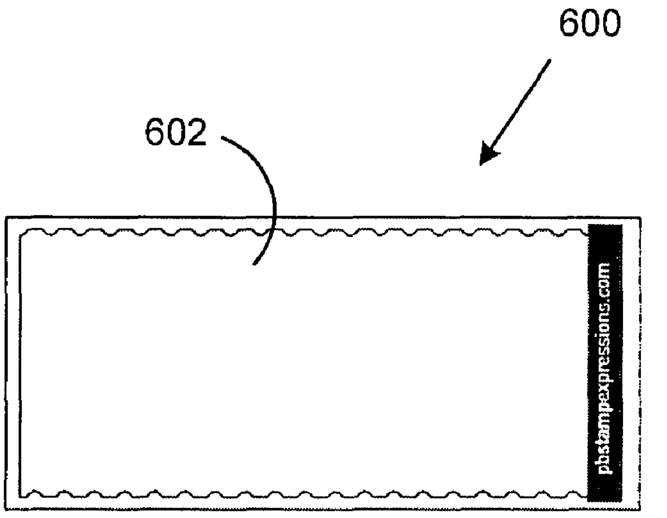
FIG. 6 illustrates another type of postage stamp blank, also shown in isolation from a roll of stamp printing stock of which it is a part.

FIG. 6 illustrates another type of postage stamp blank (generally indicated by reference numeral 600), also shown in isolation from a roll of stamp printing stock of which it is a part. Most of the front side (visible in FIG. 6) of the postage stamp blank 600 is a blank area 602, suitable for thermal printing. (In some embodiments, all of the front surface of the roll of printing stock of which the blank 600 is a part may be suitable for thermal printing.) It will be observed that the blank area 602 of postage stamp blank 600 is much larger than the blank area 206 (FIG. 2) of postage stamp blank 200. The larger size of blank area 602 is to accommodate a decorative image to be thermally printed on the blank 600 by the stamp printer 100 in addition to accommodating the same type of postage indicia information as was seen in the completed stamp of FIG. 5.

Figure 7:
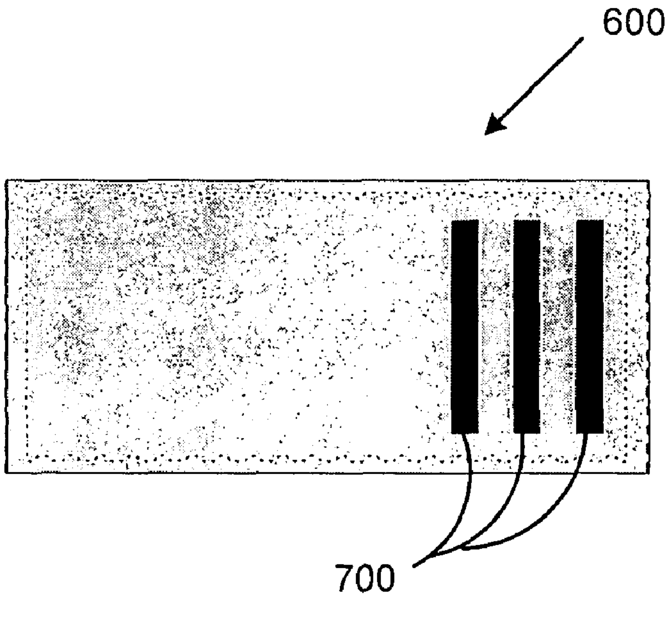
FIG. 7 shows the reverse side of the postage stamp blank of FIG. 6.

FIG. 7 shows the reverse side of the postage stamp blank 600 of FIG. 6. (Again, the reverse side of the backing is shown in FIG. 7.) The reverse side of postage stamp blank 600 has printed thereon three bars 700 rather closely spaced relative to each other (e.g., with a distance between adjacent bars about equal to the width of the bars). Each individual one of the bars 700 may be the same in size and configuration as the bars 400 shown in FIG. 4. The presence of the three bars 700 indicates to the stamp printer 100 that the printing stock of which the postage stamp blank 600 is a part does not include a pre-printed image, and is configured to accommodate a decorative image to be printed by the stamp printer 100. Thus bars 700 also serve as control indicia.

Figure 8:
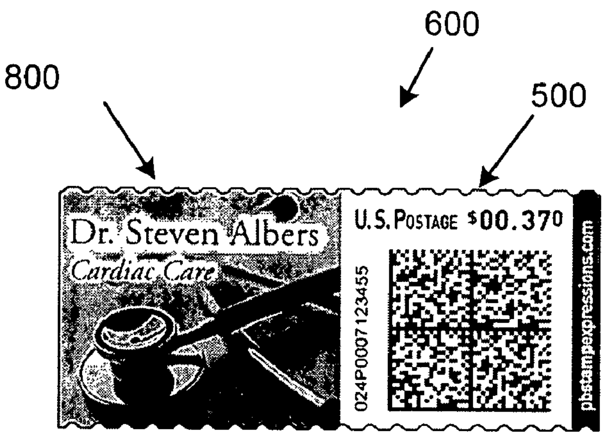
FIG. 8 shows the postage stamp blank of FIG. 6, after printing thereon by a postage stamp printer of a decorative black and white image together with postage indicia information to produce a postage stamp.

FIG. 8 shows the postage stamp blank 600 after printing thereon by the stamp printer 100. In addition to printing postage indicia information 500 as in the case of postage stamp blank 200, the stamp printer 100 also thermally prints a black and white decorative image 800.

Figure 9:
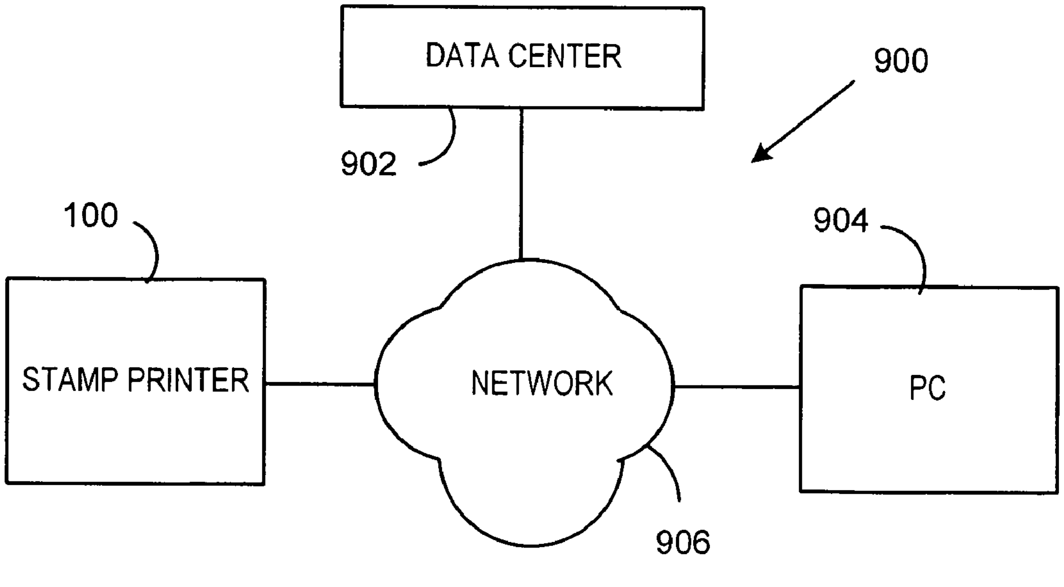
FIG. 9 is a block diagram of a data-exchange arrangement that includes the stamp printer of FIG. 1.

FIG. 9 is a block diagram of a data-exchange arrangement 900 that includes the stamp printer 100. As shown in FIG. 9, the data exchange arrangement 900 includes a data center 902, and PC 904 and a network 906 by which the stamp printer 100 is connected (at least from time to time) to either or both of the data center 902 and the PC 904. The connection between the data center 902 and the stamp printer 100 allows the stamp printer to request and receive from the data center 902 authorization to print one or more postage stamps. The connection between the stamp printer 100 and the PC 904 may allow a user (not shown) to interact with the stamp printer 100 via the PC 904 and/or may allow for control of the stamp printer 100 by the PC 904. In some embodiments there may also be exchange(s) of data between the PC 904 and the data center 902. It will be appreciated that the data connections among the stamp printer 100, the data center 902 and the PC 904 may be provided in a manner that is different from that illustrated in FIG. 9.

In some embodiments, a roll of postage printing stock may contain more than one type of pre-printed color image. That is, images of two or more different appearances may be provided in the same roll of postage printing stock. The different images may appear in a repeating sequence along the roll. For example, flag images may alternate with Statue of Liberty images, or may form a repeating sequence of a flag image, a Statue of Liberty image and a Mount Rushmore image. Four or more different images may also be provided on one roll. The images may be selected/supplied by the postal patron who orders the roll of postage printing stock. For example, the pre-printed images may reflect one or more photographs taken by the postal patron.

Figure 10:
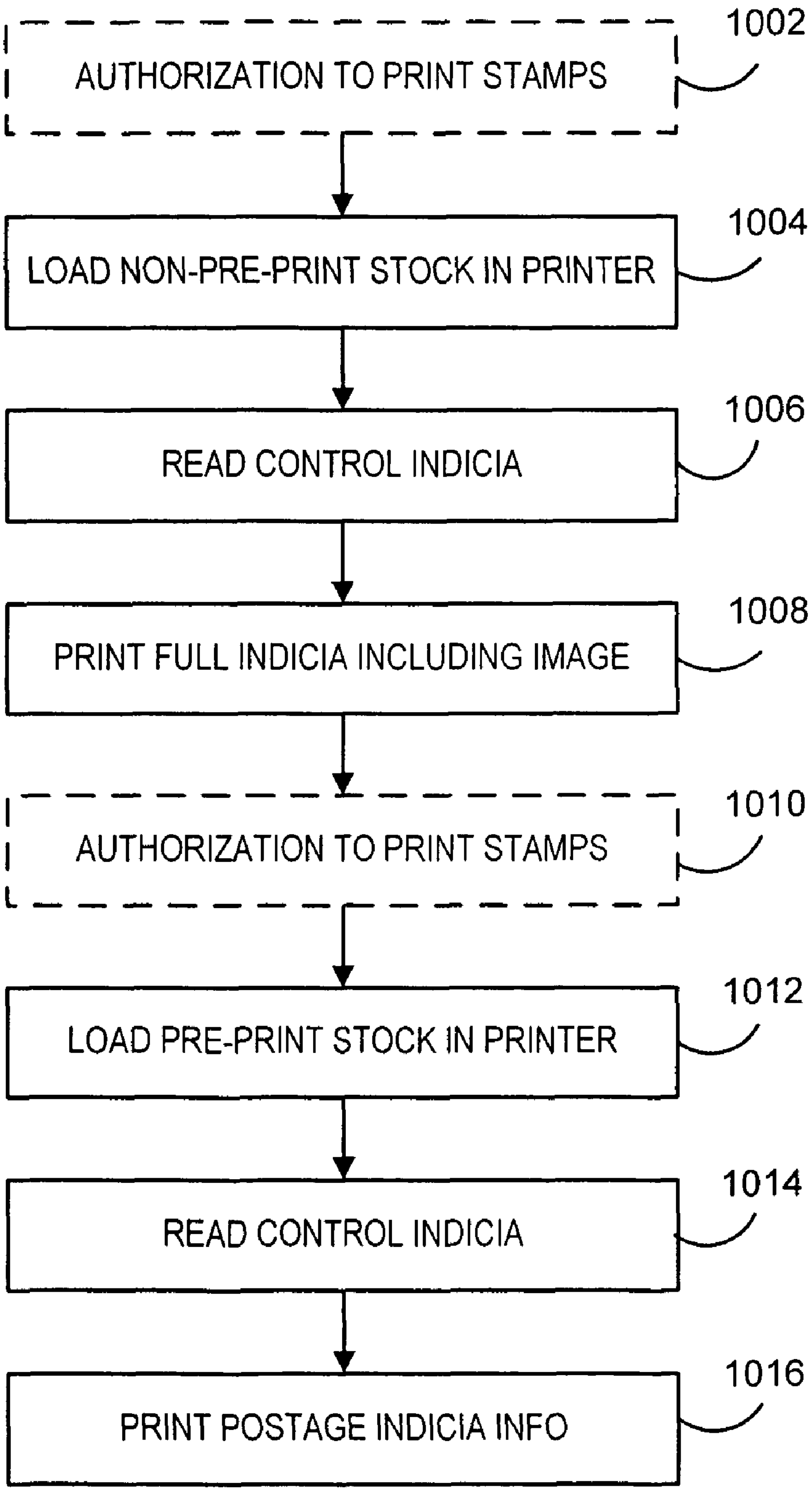
FIG. 10 is a flow chart that illustrates a process that may be performed by the stamp printer of FIG. 1.

FIG. 10 is a flow chart that illustrates a process that may be performed by the stamp printer 100.

Assuming that the stamp printer 100 had not previously been authorized to print stamps (or that all stamps previously authorized had already been printed), at 1002 in FIG. 10 the stamp printer 100 may engage in a procedure to receive authorization from the data center 902 to print postage stamps. The procedure may be in accordance with techniques that have previously been proposed. For example, the data center 902, in response to a request from the stamp printer 100 or from the PC 904, and after securing payment for the postage stamps to be printed (and possibly after receiving a fee as well), may authorize the stamp printer 100 to print 18 stamps denominated at 39 cents, plus 2 stamps denominated at $1.59. Commonly-owned, co-pending U.S. patent application Ser. No. 11/172,182, filed Jun. 30, 2005 and entitled Control Panel Label For A Postage Printing Device is incorporated by reference herein in its entirety and describes systems and methods for processing customized postage that alternatively may be advantageously utilized with the systems and methods described herein. Additionally, commonly-owned, co-pending U.S. patent application Ser. No. 11/016,493, filed Dec. 17, 2004 and entitled, Thermal Printer Temperature Management, is incorporated by reference herein in its entirety and describes certain thermal printers that alternatively may advantageously be utilized with the systems and methods described herein. Furthermore, commonly-owned, co-pending U.S. patent application, Ser. No. 11/018,707, filed Dec. 21, 2004 and entitled, Label Stock For Thermal Printer, is incorporated by reference herein in its entirety and describes certain thermal printer label stock that alternatively may advantageously be utilized with the systems and methods described herein.

At 1004, the user loads (feeds) a roll of postage stamp printing stock into the stamp printer 100. For the purposes of the present example, it is assumed that the printing stock loaded at this step is not pre-printed with decorative images; that is, it is assumed that the postage stamp blanks carried on the roll of printing stock are of the type shown in FIGS. 6 and 7 (for example). It will be appreciated that loading/feeding of the roll of printing stock may require operation of the transport mechanism 112 (FIG. 1), under the control of the control device 106.

Referring once more to FIG. 10, at 1006, the reader 110 (FIG. 1) reads the control indicia on the reverse side of the roll of printing stock (e.g., bars 700, FIG. 7) and provides an indication of the control indicia to the control device 106. From this indication, the control device 106 may determine that the roll of printing stock now in the stamp printer 100 is of a type which is not pre-printed with decorative images. Accordingly, as indicated at 1008 in FIG. 10, the control device 106 may control the print head 104 to thermally print (e.g., in black and white) on the next postage stamp blank 600 (FIGS. 6-8) a full stamp indicium, including a decorative image 800 (FIG. 8) together with the postage indicia information 500. It may be assumed that data which represents the image 800 was previously downloaded to the stamp printer 100 from the data center 902 or otherwise loaded into the stamp printer 100.

It may next be assumed that the non-pre-printed roll of postage stamp stock is exhausted and/or that further authorization for stamp printing by the stamp printer occurs (step 1010, FIG. 10). At 1012, the user loads/feeds a second roll of postage stamp printing stock into the stamp printer 100. It is now assumed that the roll of printing stock loaded at step 1012 carries postage stamp blanks of the type shown in FIGS. 2-4; in other words, the roll of printing stock now loaded is pre-printed with decorative color images, which need not all be identical. As before, the loading/feeding of the second roll of printing stock may require operation of the transport mechanism 112 under the control of the control device 106.

Referring again to FIG. 10, at 1014, the reader 110 reads the control indicia on the reverse side of the second roll of printing stock and provides an indication of the control indicia to the control device 106. From this indication, the control device 106 may determine that the second roll of printing stock is of the type that is pre-printed with (e.g., color) images. Accordingly, as indicated at 1016, the control device 106 may control the print head 104 to thermally print (e.g., in black and white) in the blank area (FIGS. 2 and 3) of the next postage stamp blank 200 the postage indicia information 500, while refraining from printing any decorative image on the stamp blank 200. The resulting finished stamp is shown in FIG. 5.

By operating in accordance with the process of FIG. 10, the stamp printer 100 may operate as a "dual use" device, in that it can print both postage stamps that incorporate pre-printed decorative (e.g. color) images as well as postage stamps that includes decorative images (e.g. black and white) produced by the stamp printer itself. In other words, the stamp printer is able to operate satisfactorily with both the type of stamp printing stock illustrated in FIGS. 2-4 and with the type of stamp printing stock illustrated in FIGS. 6 and 7.

Figure 11:
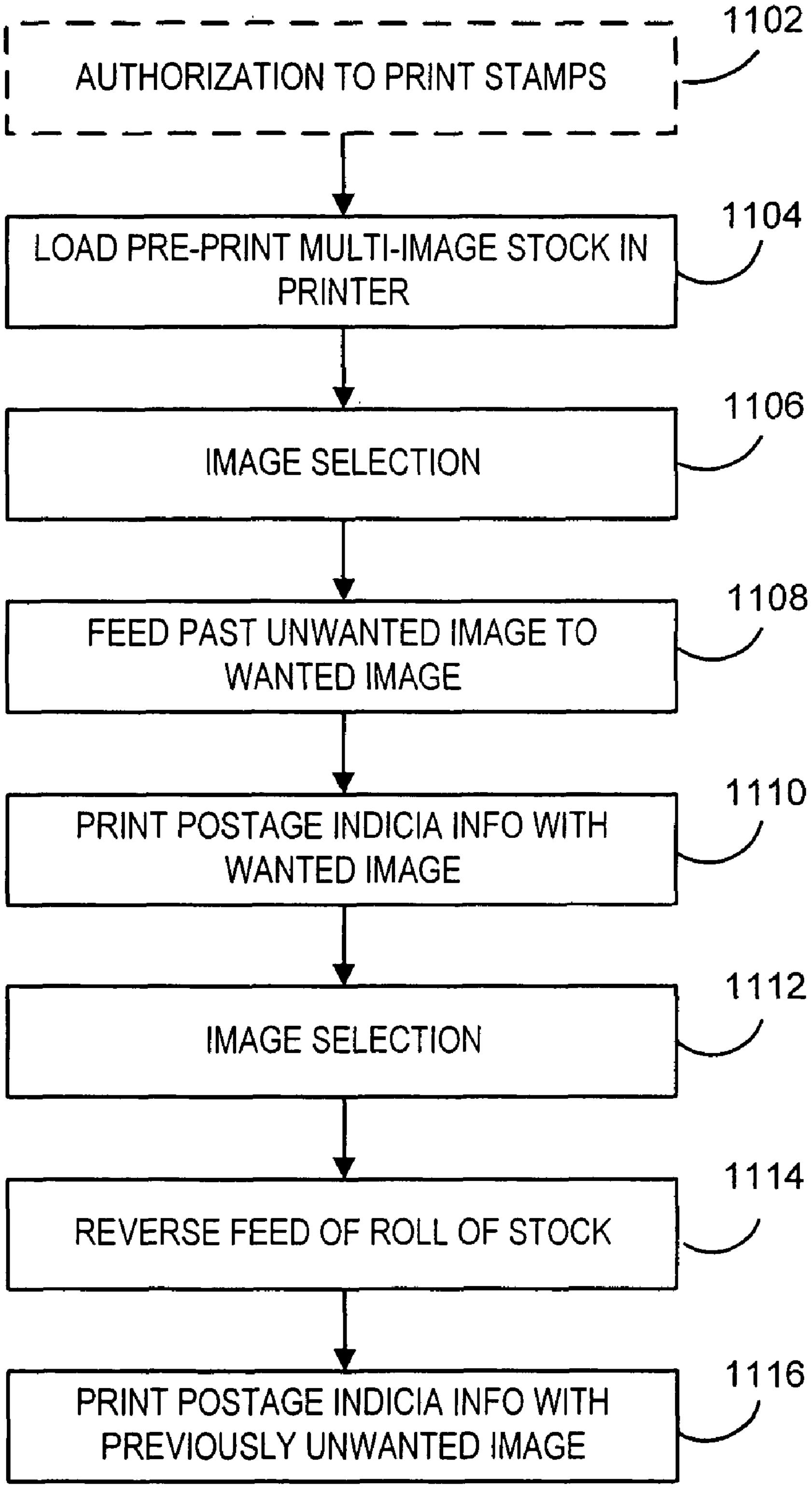
FIG. 11 is a flow chart that illustrates another process that may be performed by the stamp printer of FIG. 1.

FIG. 11 is a flow chart that illustrates another process that may be performed by the stamp printer 100.

At 1102 in FIG. 11 the stamp printer 100 may engage in a procedure to receive authorization from the data center 902 to print postage stamps (assuming such authorization had not already been received). Then, at 1104, the user loads (feeds) a roll of postage stamp printing stock into the stamp printer 100. For the purposes of the example of FIG. 11, it is now assumed that the printing stock loaded at this step is pre-printed with images (e.g., color) that are not all identical to each other. As in similar steps discussed in connection with FIG. 10, the loading/feeding of the roll of printing stock may require operation of the transport mechanism 112 (FIG. 1), under the control of the control device 106.

Since the printing stock includes two or more different pre-printed images that are different in appearance with each other (e.g., flag images interspersed with Statue of Liberty images; or depictions of George Washington interspersed with depictions of Abraham Lincoln) the user may wish to select the pre-printed image that is to be part of the next postage stamp to be printed by the stamp printer 100. Selection of the pre-printed image is indicated at 1106 in FIG. 11. In some embodiments, the user may interact with the PC 904 (FIG. 9) to select the desired image, and the PC 904 may issue a command or commands to the stamp printer 100 to implement the selection made by the user. For example, the stamp printer may, via the reader 110, read control indicia or other information from the roll of postage stamp stock loaded in the stamp printer to determine which images are on the roll of postage stamp stock and in which locations. (Alternatively, this information may be entered into the PC 904 by the user—e.g., by entering into the PC 904 a unique identification number for the roll of postage stamp stock—and/or the information about which images are on the roll of stock and where may be downloaded to the PC 904 from the data center 902 or from another source, such as a server maintained by the entity which pre-printed the images on the postage stamp stock.) In any event, once the PC has the information concerning what images are on the roll of postage stamp stock, it may display to the user (via a display screen which is not separately shown) the various images (e.g., in "thumbnail" form) available on the roll of postage stamp stock loaded in the stamp printer 100. The user may indicate selection of a particular one of the images by "clicking" on the desired "thumbnail" with a mouse/cursor arrangement of a graphical user interface provided by the PC 904. Assuming that the PC has information indicative of where the next matching pre-printed image is on the roll of postage stamp stock, the PC may command the stamp printer 100 to advance (feed) the roll of stock to the desired image (if the desired image is not already available at the print head 104). Alternatively, the stamp printer 100 may have stored therein information indicative of where on the roll of printing stock the various images are, and may merely receive from the PC an identifier for the desired image. The stamp printer may then feed the roll of printing stock as needed to reach the desired image. It will be appreciated that either one or both of the stamp printer and the PC may keep track of the number of postage stamp blanks on the roll of postage stamp blanks that have already been printed on or fed past the print head without printing. In other words, either or both of the stamp printer and the PC may track what location (which postage stamp blank) on the roll of printing stock is currently at the print head, along with tracking which blanks have already been printed on to produce finished stamps. In addition or alternatively, the user may interact with a user interface on the stamp printer to select a particular postage stamp blank for printing, thereby selecting a particular pre-printed image for the next postage stamp to be printed by the stamp printer. In addition or alternatively, each stamp blank may carry fluorescence, and the stamp printer may detect the presence of a stamp blank on the backing of the printing stock by detecting the presence of fluorescence.

For the purposes of the particular example illustrated in FIG. 11, it is assumed that the desired image selected by the user is not on the next postage stamp blank currently positioned for printing by the print head 104. Accordingly, and as indicated at 1108, the stamp printer operates to advance the next postage stamp blank (and possibly one or more other blanks as well) past the print head until the stamp blank with the desired image is brought to the print head. That is, the control device 106 may control the transport mechanism 112 to feed the roll of postage stamp stock in the manner described in the previous sentence. Then, as indicated at 1110, the control device 106 may control the print head 104 to print the required postage indicia information 500 in the blank area 206 (FIGS. 2 and 3) of the postage stamp blank 200 that includes the desired image. The postage indicia information may reflect a stamp denomination selected by the user. In this way, a finished stamp is produced that includes both the pre-printed image selected by the user as well as, potentially, a postage denomination selected by the user.

For the purposes of the example illustrated in FIG. 11, it is next assumed that the user selects another image (at 1112 in FIG. 11), which is carried on a postage stamp blank that was previously fed past the print head and which has not previously been printed on by the stamp printer. Consequently, it is necessary, or at least desirable, for the stamp printer to reverse-feed (step 1114) the roll of printing stock to bring the stamp blank which carries the now-desired image back to the print head. The control device 106 may control the transport mechanism 112 accordingly. Then, as indicated at 1116, the control device 106 may control the print head 104 to print the required postage indicia information 500 in the blank area 206 of the postage stamp blank (previously fed past the print head and then reverse-fed back to the print head) which carries the pre-printed image selected at 1112.

With the process described in FIG. 11, the stamp printer (and possibly the PC in combination with the stamp printer) may virtually provide the user with "random access" to any pre-printed image on the roll of postage stamp stock, by advancing and/or reverse feeding the roll of postage stamp stock. As a result, the user may be able to freely select for inclusion, in the next stamp printed by the stamp printer, any one of the various pre-printed images carried on a multi-image pre-printed roll of postage stamp stock.

In some embodiments, the stamp printer may include a sensing capability to allow the stamp printer to sense whether a stamp blank has previously been removed from a particular location along the roll of printing stock. This sensing capability may be provided in a number of different ways. For example, the label stock backing may be highly reflective, and the stamp printer may include a sensor (not shown) to detect whether light reflects from a particular location on the printing stock, thereby indicating that the stamp blank has been removed at that location. As an alternative, the stamp blanks may be florescent, and the absence of florescence may be detected to indicate that the stamp blank has been removed. As another alternative, the stamp printer may determine that the roll of printing stock is opaque at a particular location, thereby determining that the stamp blank remains in place at that location. As still another alternative, the stamp blanks may be pre-printed with bar codes, which may be read by the stamp printer to indicate that the stamp blanks remain on the roll of printing stock. In the latter case, the stamp blank pre-printed barcodes may be used to detect the current location along the roll of printing stock. It may also be desirable for the stamp printer to track where the current location on the roll of printing stock is located along the length of the printing stock, so that, among other benefits, the stamp printer may be prevented from rewinding the roll past the beginning.

It should be understood that the processes described above in connection with FIGS. 10 and 11 are not mutually exclusive and indeed may be combined together in a single process. Moreover, the illustrations of FIGS. 10 and 11 and the above descriptions are not meant to imply a fixed order for performing the process steps; rather the steps may be performed in any order that is practicable. For example, steps 1012-1016 of FIG. 10 may be performed prior to steps 1004-1008. Further, the loading of a roll of stamp printing stock into the stamp printer may take place before the stamp printer receives authorization from the data center for the stamps to be printed on the roll of printing stock. One authorization step may be performed to authorize printing of stamps on two or more rolls of printing stock and/or more than one authorization step may be performed for printing of stamps from a single roll of printing stock.

Although not shown in the drawings, the postage stamp printing stock may be modified to include an additional blank space to receive printing by the stamp printer of a return address of a user and/or holder of the stamp printer. Concomitantly, the postage stamp printer may operate to print a user's/holder's return address on the postage stamp printing stock along with the postage indicia information (and also with a decorative image, in cases where the printing stock is not of the type that has pre-printed color images).

In some embodiments, the user's/holder's return address may be pre-printed on the postage stamp printing stock. In some embodiments, the stamp printer may read control indicia on the reverse side of the printing stock to determine whether the printing stock carries a pre-printed return address. If not, the stamp printer may print the return address on the printing stock, as described in the previous paragraph. If the printing stock carries the pre-printed return address, the stamp printer refrains from printing the return address on the printing stock.

The stamp printer 100 described above is a "dual use" device in that it is operable both with pre-printed and non-pre-printed postage stamp printing stock. However, in other embodiments, the stamp printer may operate only to complete stamps for which decorative images are pre-printed on the postage stamp printing stock. In either case, it is not required that the pre-printed images be in color.

The postage stamp printing stock described above is in the form of a continuous roll. However, in other embodiments, single labels each with a pre-printed color image thereon may be used for printing postage stamps. Such labels may be used in conjunction with a stamp printer similar to the stamp printer 100 described above, but adapted to operate with single labels. In addition, or alternatively, single labels each with a pre-printed color image thereon may be printed with postage indicia information with a device similar to a conventional postage meter. In some embodiments, the printing stock may be light-sensitive stock instead of being heat sensitive at the location of the blank area for printing the postage information.

In some embodiments, the control indicia may guide the stamp printer in regard to decisions besides whether or not to print a decorative image. For example, the control indicia may also or alternatively guide the stamp printer as to the location(s) and/or dimensions and/or print head power settings with which postage indicia information and/or decorative images are to be printed by the stamp printer.

In some embodiments, the required postage indicia information may be printed on the postage stamp printing stock at a kiosk rather than by a personal postage stamp printer. Accordingly, the postal patron may obtain desired postage stamp printing stock (including pre-printed color images) from a printing company, and may bring the printing stock to a kiosk. At the kiosk, the user may feed the printing stock into a printing module of the kiosk and may pay for desired postage (e.g., by credit/debit card submitted by the postal patron for reading by the kiosk). The kiosk then prints on the printing stock to produce finished postage stamps with images that were previously selected by the postal patron in obtaining the printing stock. The kiosk may be operable to allow the user to select a specific image on which a desired amount of postage is to be printed.

In other embodiments, the postal patron obtains the postage stamp printing stock with desired pre-printed images from the printing company, and then goes to a post office window. The postal service window clerk then receives payment from the postal patron and operates a printer at the window to convert the postage stamp printing stock into finished postage stamps. In still another embodiment, a commercial vendor may be authorized by the postal authorities to receive payment for postage and to convert postage stamp printing stock presented by a postal patron into finished stamps at a point of sale.

In some embodiments, at least a portion of the control indicia may be on the front side of the printing stock rather than on the reverse side. The control indicia may take a form other than or in addition to the bars illustrated in the drawings.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A roll of label stock comprising:

a plurality of labels, each of the plurality of labels including a first region for being printed on by thermal printing, said first region being blank; and each of the plurality of labels including a pre-printed color image associated with a respective one of the first regions; and wherein, the pre-printed color image of one of the plurality of labels includes a first pre-printed color image, and the pre-printed color image of another of the plurality of labels includes a second pre-printed color image that is different from the first pre-printed color image, each of the first and second different pre-printed color images defining a picture image and being disposed at difference locations along a length of the label stock.

2. The roll of label stock according to claim 1, wherein the pre-printed color images are printed on by one of ink-jet printing and off-set printing.

3. The roll of label stock according to claim 2, wherein, each of the pre-printed color images is in a second region comprising thermal media treated to accept at least one of ink-jet printing and off-set printing.

4. The roll of label stock according to claim 2, wherein, each of the labels is configured to receive a postage indicium printed in the blank region by thermal printing.

5. The roll of label stock according to claim 1 wherein the label stock includes a front side for receipt of printed images, and wherein the plurality of first regions and plurality of pre-printed color images are disposed on the front side of the label stock.

6. The roll of label stock according to claim 5 wherein each of the first regions and pre-printed color images of the label stock are disposed adjacent to one another and along the length of the label stock.

7. The roll of label stock according to claim 6 wherein the pre-printed color images and the first regions alternate along the length of the label stock.

8. The roll of label stock according to claim 6, wherein at least one of the pre-printed color images is different from at least one other of the pre-printed color images.

9. A value indicia printer comprising:

a housing;

a thermal print head installed in the housing;

control means in the housing for controlling the thermal print head; and reading means in the housing for reading control indicia on printing stock;

said control means responsive to said reading means to detect a type of the printing stock;

said control means operative to cause the print head to print images and value indicia on the printing stock if the detected type of the printing stock is of a first type; and if the detected type of the printing stock is of a second type having a plurality of blank regions and a plurality of different pre-printed color picture images disposed on a front surface of the printing stock and wherein at least one of the pre-printed color images is associated with at least one blank region, said control means operative to cause the print head to print value indicia in the blank region of the printing stock, said control means further responsive to said reading means to detect each of the different pre-printed color picture images.

10. The value indicia printer according to claim 9, wherein the value indicia are postage indicia, and the printer is a stamp printer.

11. The value indicia printer according to claim 10, wherein the printing stock is a roll of printing stock, and further comprising:

transport means in the housing for receiving the roll of printing stock and transporting the roll of printing stock past the print head.

12. The value indicia printer according to claim 11, further comprising communication means for interfacing the control means to a computer.

13. The value indicia printer according to claim 12, wherein the control means is operative to control the transport means in response to input received by the control means from the computer.

* * * * *